US010515276B2

United States Patent
Sakashita et al.

(10) Patent No.: US 10,515,276 B2
(45) Date of Patent: Dec. 24, 2019

(54) ROOM OCCUPANT MONITORING SYSTEM (71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/248,174

(22) Filed: Jan. 15, 2019

(65) Prior Publication Data
US 2019/0236376 A1 Aug. 1, 2019

(30) Foreign Application Priority Data

Jan. 31, 2018 (JP) .................................. 2018-015468

(51) Int. Cl.
*G06Q 20/00* (2012.01)
*G06K 9/00* (2006.01)
*G07C 9/00* (2006.01)

(52) U.S. Cl.
CPC ..... *G06K 9/00771* (2013.01); *G06K 9/00778* (2013.01); *G07C 9/00158* (2013.01)

(58) Field of Classification Search
None
See application file for complete search history.

(56) References Cited

U.S. PATENT DOCUMENTS 8,209,264 B2 * 6/2012 Wakabayashi ..... G06Q 20/3821
340/5.2

FOREIGN PATENT DOCUMENTS

JP 2007-231571 A 9/2007

* cited by examiner

*Primary Examiner* — K. Wong (57) ABSTRACT

In a room occupant monitoring system, if any ID information stored in a personal data storage section matches ID information on an entry applicant acquired from an ID storage medium by an information acquisition section and a number of room occupants detected based on results of permission for room entry and exit has reached a maximum number of persons detectable from a monitoring camera's video, a control unit of a server compares degrees of priority, which are stored in a storage section of the server, between the entry applicant and all the room occupants and (i) refuses permission for the entry applicant having a lower degree of priority than all the room occupants to enter the room or, (ii) if there is any room occupant having a lower degree of priority than the entry applicant, performs room exit request processing for requesting the lower-degree-of-priority room occupant to leave the room.

10 Claims, 5 Drawing Sheets

ROOM OCCUPANT MONITORING SYSTEM

INCORPORATION BY REFERENCE

This application claims priority to Japanese Patent Application No. 2018-015468 filed on 31 Jan. 2018, the entire contents of which are incorporated by reference herein.

BACKGROUND

The present invention relates to a room occupant monitoring system and particularly relates to a technique for monitoring persons in a room.

Recently, room entry and exit management using cameras has been done. For example, a room entry and exit management system is known in which a camera, a card reader, and a numeric keypad are provided on each of the inside and outside of a room entry and exit management area, a controller is connected to an electronic lock in a gate of the room entry and exit management area, and the controller includes: a storage section storing card information on respective cards for users; a card authentication section for authenticating the validity of a user's card by checking information read by the card reader against the card information in the storage section; a locking and unlocking control section for controlling locking and unlocking of the electronic lock based on a result of checking of the number of persons having entered or left the area, determined from inputs to the numeric keypads, against the number of persons having entered or left the area, acquired from camera footage; and a total room occupant number calculating section that, upon agreement between both the numbers of persons in the locking and unlocking control section, adds or subtracts the number of persons entering or leaving the area to or from the total room occupant number to update the total room occupant number.

SUMMARY

A technique improved over the aforementioned technique is proposed as one aspect of the present disclosure.

A room occupant monitoring system according to one aspect of the present disclosure includes a personal data storage section, an information acquisition section, a monitoring camera, and a server. The personal data storage section stores respective pieces of ID information on persons. The information acquisition section is provided at an entrance of a room and acquires, at time of entry and exit of a person into and from the room, a piece of ID information from an ID storage medium that the person carries. The monitoring camera is installed in the room and captures a video of an inside of the room. The server includes a control unit and a storage section. The control unit contains a processor and functions as, upon execution of a control program by the processor, a room entry and exit management section that performs ID authentication by comparison of the pieces of ID information stored in the personal data storage section with the piece of ID information acquired from the ID storage medium of the person by the information acquisition section and determines, based on a result of the ID authentication, whether or not to allow the person to enter or leave the room, a room occupant detecting section that detects, based on results of permission for persons to enter and leave the room determined by the room entry and exit management section, persons present in the room at time of the ID authentication and a number of the persons in the room at time of the ID authentication, and a person detecting section that analyzes the video captured by the monitoring camera to detect an individual person in the video. The room entry and exit management section allows the storage section to store respective predetermined degrees of priority for the persons to be allowed to stay in the room. If, upon the ID authentication for an entry applicant newly wishing to enter the room, one of the pieces of ID information stored in the personal data storage section matches the piece of ID information on the entry applicant acquired from the ID storage medium by the information acquisition section and the number of persons detected by the room occupant detecting section has reached a maximum number of persons detectable by the person detecting section, the room entry and exit management section compares the degree of priority for the entry applicant with the degrees of priority for all persons under management of the room occupant detecting section and, (i) if the degree of priority for the entry applicant is lower than the degrees of priority for all the persons under the management, refuses permission for the entry applicant to enter the room or, (ii) if the degree of priority for any one of all the persons under the management is lower than the degree of priority for the entry applicant, performs room exit request processing for requesting the person having the lower degree of priority to leave the room.

DETAILED DESCRIPTION

Hereinafter, a description will be given of a room occupant monitoring system according to an embodiment of the present disclosure with reference to the drawings.

Figure 1:
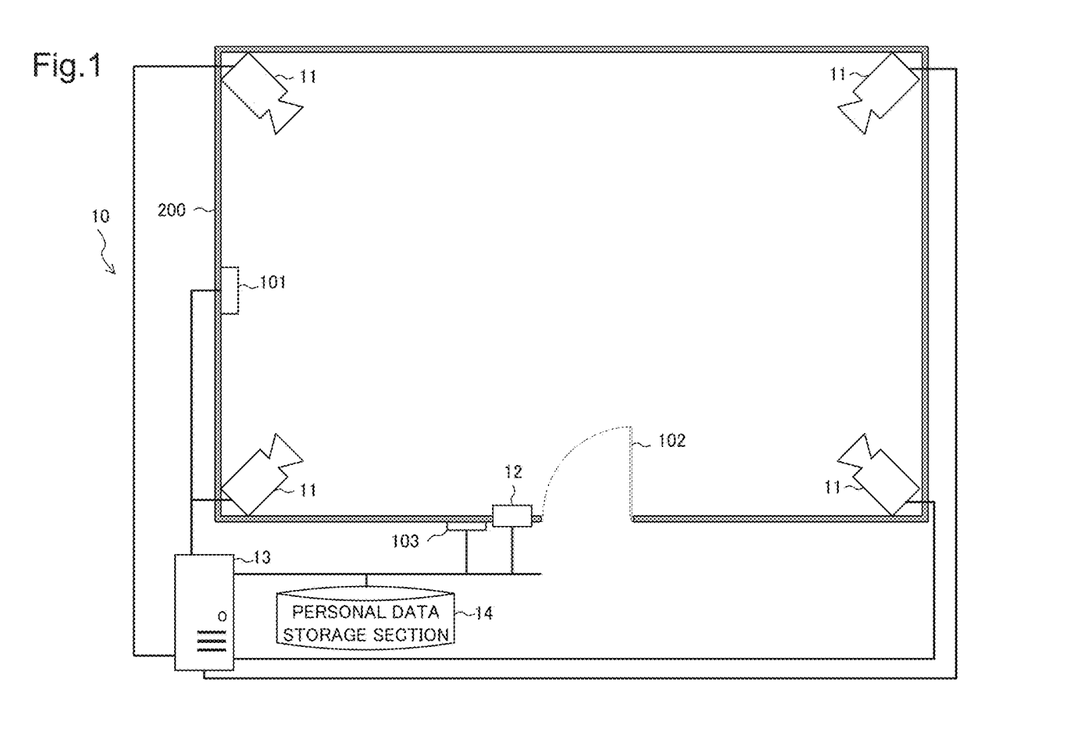
FIG. 1 is a diagram showing a schematic configuration of a room occupant monitoring system according to one embodiment of the present disclosure.

FIG. 1 is a diagram showing a schematic configuration of a room occupant monitoring system according to an embodiment of the present disclosure. A room occupant monitoring system 10 according to an embodiment of the present disclosure includes a monitoring camera 11, an ID card reader 12, a server 13, and a personal data storage section 14.

The monitoring camera 11 comprises a plurality of monitoring cameras. The monitoring cameras 11 are installed at different locations in a room 200 to achieve video shooting throughout the room 200. These monitoring cameras 11 are connected to the server 13 and each monitoring camera 11 has the function of transmitting its captured video to the server 13.

The ID card reader (an example of the information acquisition section defined in What is claimed is) 12 reads an ID card (an example of the ID storage medium) of a person attempting to enter the room 200 and an ID card of a person attempting to leave the room 200. The ID card contains, for example, an IC chip capable of storing various types of information. For example, any person attempting to enter the room 200 and any person attempting to leave the room 200 pass their ID cards over the ID card reader 12. At this time, the ID card reader 12 reads out a piece of ID information stored in the IC chip. The ID card reader 12 has the function of transmitting the read piece of ID information to the server 13.

The ID card reader 12 is placed near the door of the room 200 and has respective mechanisms capable of reading an ID card on both the outside and inside of the room 200. When reading a piece of ID information from the IC chip of an ID card through the mechanism on the outside of the room 200, the ID card reader 12 transmits to the server 13 the piece of ID information as one on an entry applicant wishing to enter the room 200. When reading a piece of ID information from the IC chip of an ID card through the mechanism on the inside of the room 200, the ID card reader 12 transmits to the server 13 the piece of ID information as one on an exit applicant wishing to leave the room 200.

The ID card reader 12 is connected to the personal data storage section 14 managing respective pieces of ID information on persons and to the server 13. The ID card reader 12 has the function of transmitting information read by the ID card reader 12 to the server 13.

Although in this embodiment the description has been given by taking the ID card reader 12 as an example of the information acquisition section defined in What is claimed is, the information acquisition section may be an image pickup device for use in face authentication, a fingerprint reader for use in fingerprint authentication or the like. In these cases, the image pickup device and the fingerprint reader have the function of transmitting an acquired image to the server 13. Each of the image (including a face image representing a person's face) shot by the image pickup device and the image representing a fingerprint read by the fingerprint reader is transmitted as the piece of ID information on the person from the image pickup device or the fingerprint reader to the server 13.

The personal data storage section 14 is formed of, for example, a database that stores respective sets of identifying information on the persons. For example, if the personal data storage section 14 is a personnel management database for a company, the personal data storage section 14 stores, as a set of identifying information on each person, a piece of ID information, the name, the birth date, the hire date, the department, the post, the extension number, and so on. The personal data storage section 14 is connected to the server 13 so as to be capable of data communication with the server 13.

Figure 2:
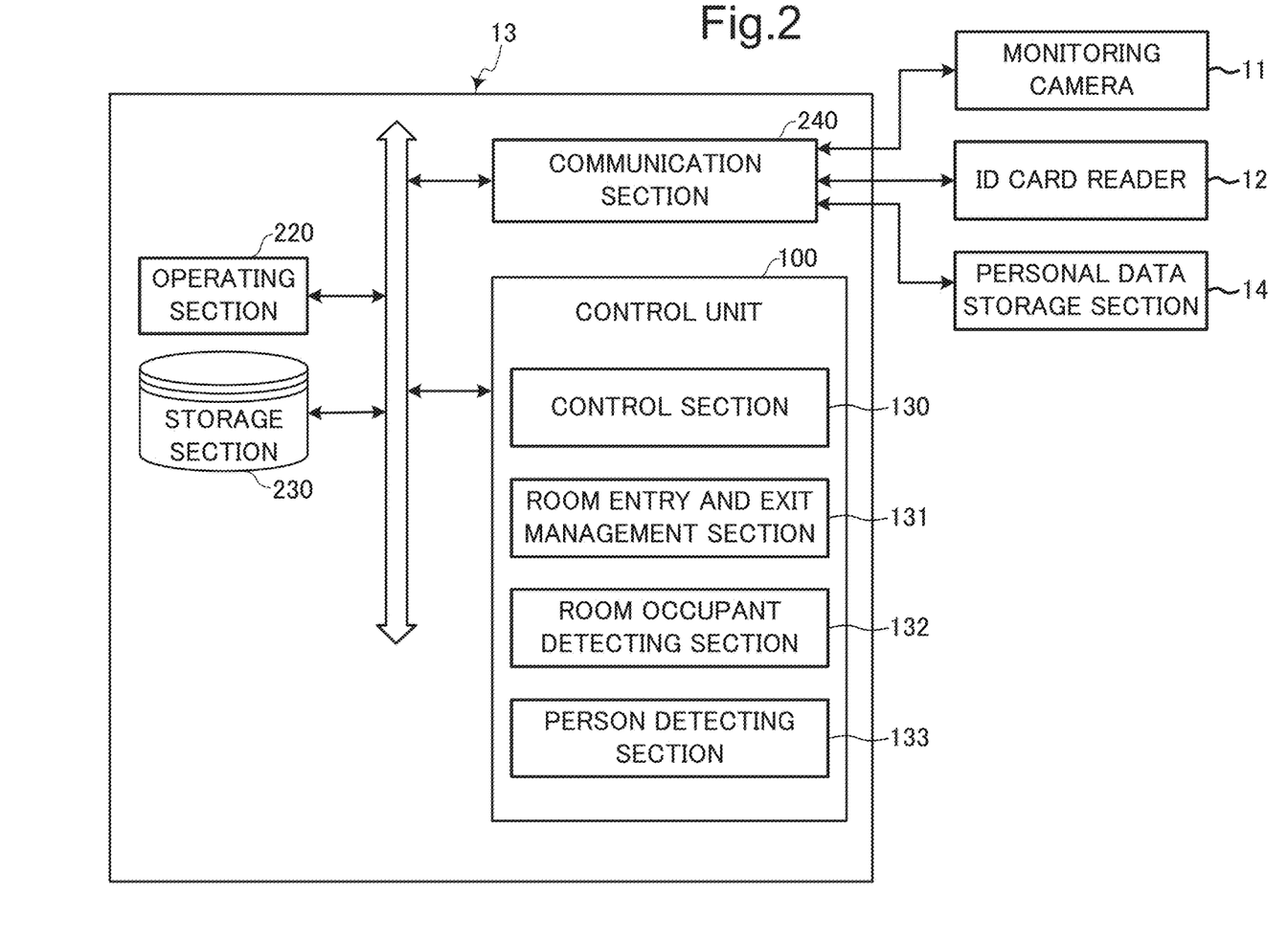
FIG. 2 is a block diagram of a main part of a server.

Next, a description will be given of the server 13. FIG. 2 is a block diagram of a main part of the server 13. The server 13 includes a control unit 100, an operating section 220, a storage section 230, and a communication section 240. The operating section 220 is an input device, including a mouse and a keyboard. The storage section 230 is a storage device, such as an HDD (hard disk drive) or a flash memory. The communication section 240 is a communication interface including a communication module, such as a LAN chip. The communication section 240 is connected through a LAN or an Internet network to the monitoring cameras 11, the ID card reader 12, and the personal data storage section 14 so as to be capable of data communication with them.

The control unit 100 is made up by including a processor, a RAM (random access memory), a ROM (read only memory), and a dedicated hardware circuit. The control unit 100 functions as a control section 130, a room entry and exit management section 131, a room occupant detecting section 132, and a person detecting section 133 by the operation of the processor in accordance with a program stored in the storage section 230. However, each of the control section 130, the room entry and exit management section 131, the room occupant detecting section 132, and the person detecting section 133 may not be implemented by the operation of the control unit 100 in accordance with the program, but may be constituted by a hardware circuit.

The control section 130 governs the overall operation control of the server 13.

The room entry and exit management section 131 performs ID authentication by comparing the pieces of ID information stored in the personal data storage section 14 with the piece of ID information received from the ID card reader 12 and determines, based on the result of the ID authentication, whether or not the person indicated by the received piece of ID information is a pre-approved person. When determining, based on the ID authentication, that one of the pieces of ID information stored in the personal data storage section 14 matches the piece of ID information received from the ID card reader 12, the room entry and exit management section 131 determines that the person indicated by the received piece of ID information is a pre-approved person. On the other hand, when determining that any piece of ID information stored in the personal data storage section 14 does not match the received piece of ID information, the room entry and exit management section 131 determines that the person indicated by the received piece of ID information is not a pre-approved person.

In the case where the information acquisition section is an image pickup device, the personal data storage section 14 further stores, as a portion of each piece of ID information, a face image representing the face of a pre-approved person. If a face image contained in a shot image as a piece of ID information received from the image pickup device matches one of face images contained in the pieces of ID information stored in the personal data storage section 14, the room entry and exit management section 131 determines that the person indicated by the received piece of ID information is a pre-approved person. On the other hand, if the face image contained in the shot image does not match any face image contained in the pieces of ID information in the personal data storage section 14, the room entry and exit management section 131 determines that the person indicated by the received piece of ID information is not a pre-approved person.

In the case where the information acquisition section is a fingerprint reader, the personal data storage section 14 further stores, as a portion of each piece of ID information, a fingerprint image representing the fingerprint of a pre-approved person. If a fingerprint image as a piece of ID information received from the fingerprint reader matches one of fingerprint images contained in the pieces of ID information stored in the personal data storage section 14, the room entry and exit management section 131 determines that the person indicated by the received piece of ID information is a pre-approved person. On the other hand, if the received fingerprint image does not match any fingerprint image contained in the pieces of ID information in the personal data storage section 14, the room entry and exit management section 131 determines that the person indicated by the received piece of ID information is not a pre-approved person.

In performing the above determination for an exit applicant, when determining that the received piece of ID information matches one of the pieces of ID information stored in the personal data storage section 14, the room entry and exit management section 131 allows the person indicated by the received piece of ID information to leave the room. On the other hand, when determining that the received piece of ID information does not match any piece of ID information stored in the personal data storage section 14, the room entry and exit management section 131 does not allow the person indicated by the received piece of ID information to leave the room. The room entry and exit management section 131 manages persons under management (i.e., those who have been allowed to enter the room but have not yet been allowed to leave the room) based on respective pieces of ID information assigned to these individual persons.

The room occupant detecting section 132 detects, based on the results of permission for each person to enter and leave the room 200 by the room entry and exit management section 131, persons present in the room 200 at the time of the last ID authentication and the number of persons in the room 200 at the time of the last ID authentication. For example, the room occupant detecting section 132 identifies, as persons present in the room 200, persons who have been allowed to enter the room 200 but not yet allowed to leave the room 200 by the room entry and exit management section 131 and allows the storage section 230 to store the identified persons as the persons present in the room 200. On the other hand, as for any person who has been allowed to enter and leave the room 200, the room occupant detecting section 132 does not allow the storage section 230 to store the person as the person present in the room 200.

Furthermore, for example, the room occupant detecting section 132 detects, as the number of persons present in the room 200, the total number of persons under management of the room occupant detecting section 132 or the number of persons obtained by subtracting, at the time of the last ID authentication, the number of persons having been allowed for room exit by the room entry and exit management section 131 from the total number of persons having been allowed for room entry by the room entry and exit management section 131.

The person detecting section 133 analyzes the respective captured videos transmitted from the plurality of monitoring cameras 11 to detect individual persons in the videos. For example, the person detecting section 133 detects human body images in the above captured videos based on a known human detection technique. For example, the person detecting section 133 extracts the profile or the like of each object from the captured video and determines whether or not the extracted profile matches the profile represented by a predetermined human body image. When determining that the extracted profile matches the profile of the predetermined human body image, the person detecting section 133 detects the object as a person. If the captured image contains a plurality of objects, the person detecting section 133 determines whether or not the plurality of objects are persons and thus detects a plurality of persons. For example, in order to distinguish the plurality of detected persons from each other, the person detecting section 133 identifies the individual persons by assigning individual identification numbers to them.

Furthermore, in performing ID authentication for an entry applicant newly wishing to enter the room 200 when the number of persons detected by the room occupant detecting section 132 has already reached a predetermined maximum number of persons detectable by the person detecting section 133, the room entry and exit management section 131 compares the degree of priority for the entry applicant with the degrees of priority for all persons under management of the room occupant detecting section 132 and, (i) if the degree of priority for the entry applicant is lower than the degrees of priority for all the persons under the management, refuses permission for the entry applicant to enter the room 200 or, (ii) if the degree of priority for any one of all the persons under the management is lower than the degree of priority for the entry applicant, performs room exit request processing for requesting the person having the lower degree of priority to leave the room 200. The degree of priority indicates a predetermined degree of permission for each person under the management to stay in the room 200 in priority to the other persons and the respective degrees of priority for the persons under the management are stored in the storage section 230 by the room entry and exit management section 131.

There is an upper limit to the number of persons detectable by the person detecting section 133. If the number of persons in the captured videos provided from the monitoring cameras 11 (i.e., the number of human detections by the person detecting section 133 within a fixed period of time) exceeds the upper limit, the person detecting section 133 cannot correctly detect each person in the captured videos. Therefore, if any person is likely to enter the room 200 in excess of the maximum number of persons detectable by the person detecting section 133 as in the above case, the room entry and exit management section 131 performs processing for refusing permission for the person to enter the room 200 or the room exit request processing. These pieces of processing will be described below in detail as room occupant monitoring processing.

Figure 3:
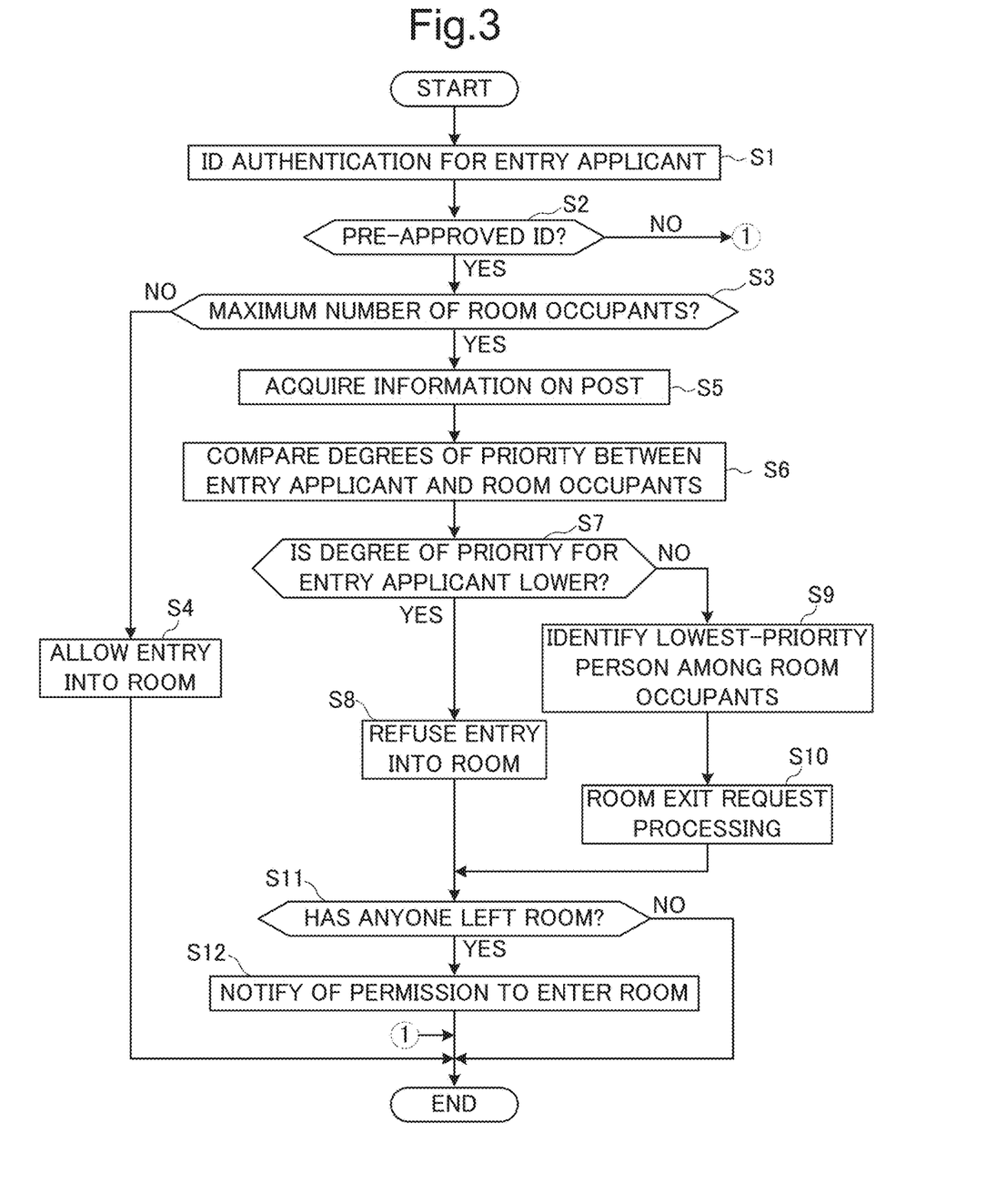
FIG. 3 is a flowchart showing a first embodiment of room occupant monitoring processing by the room occupant monitoring system according to the one embodiment of the present disclosure.

Next, a description will be given of the operation of the room occupant monitoring system 10. FIG. 3 is a flowchart showing a first embodiment of room occupant monitoring processing by the room occupant monitoring system 10.

When an entry applicant wishing to enter the room 200 passes his/her ID card over the ID card reader 12, the ID card reader 12 reads out the piece of ID information on him/her from the IC chip of the ID card. The ID card reader 12 transmits the read piece of ID information to the server 13.

The room entry and exit management section 131 of the server 13 performs ID authentication for the entry applicant by determining whether or not the piece of ID information transmitted from the ID card reader 12 matches any piece of ID information stored in the personal data storage section 14 (step S1).

If, as the result of the ID authentication, one of the pieces of ID information stored in the personal data storage section 14 matches the piece of ID information transmitted from the ID card reader 12, the room entry and exit management section 131 determines that the person indicated by the transmitted piece of ID information (the above entry applicant) is a pre-approved person (YES in step S2). On the other hand, if any piece of ID information in the personal data storage section 14 does not match the transmitted piece of ID information, the room entry and exit management section 131 determines that the person indicated by the transmitted piece of ID information is not a pre-approved person (NO in step S2) and ends the processing without allowing for his/her entry into the room 200.

In doing so, the room entry and exit management section 131 may restrict the entry of the current entry applicant into the room 200 by controlling an entrance gate 120 shown in FIG. 1 not to open. Furthermore, in doing so, the room entry and exit management section 131 may allow a display 103 disposed near the entrance gate 102 to display a message indicating that his/her entry into the room 200 has not been allowed. In the case of the above control, the entrance gate 102 includes an automatic locking/unlocking mechanism, is connected to the server 13, and locks and unlocks by the automatic locking/unlocking mechanism according to an instruction from the room entry and exit management section 131. The display 103 is connected to the server 13 and displays a screen indicating contents according to the instruction from the room entry and exit management section 131.

Alternatively, if the determination in step S2 is NO, the room entry and exit management section 131 may not perform the processing for not allowing for entry into the room 200, but may instead allow for entry into the room 200 and additionally allow a speaker provided in the ID card reader 12 to sound a message requesting the entry applicant to refrain from entering the room 200. In the case of this kind of control, the speaker is connected to the server 13 and sounds various messages according to instructions from the room entry and exit management section 131.

Still alternatively, the room entry and exit management section 131 may use an e-mail sending function of the communication section 240 to perform processing for sending an e-mail containing a message requesting the current entry applicant to refrain from entering the room 200 to a mobile terminal that the entry applicant carries or may allow the display 103 to display a message indicating that the entry into the room 200 has not been allowed. In this case, the personal data storage section 14 previously stores e-mail addresses on an ID-by-ID basis and the room entry and exit management section 131 accesses the personal data storage section 14, reads out an e-mail address stored in association with the ID of the current entry applicant, and uses the e-mail address for the above e-mail sending processing.

When determining as described above that the person indicated by the transmitted piece of ID information (the above entry applicant) is a pre-approved person (YES in step S2), the room entry and exit management section 131 determines whether or not the number of persons having been detected by the room occupant detecting section 132 at the time of ID authentication in step S1 has reached the predetermined maximum number of persons detectable by the person detecting section 133 (step S3). When determining that the number of persons being allowed to stay in the room 200 at the time of ID authentication in step S1 has not reached the predetermined maximum number of persons detectable by the person detecting section 133 (NO in step S3), the room entry and exit management section 131 allows the person indicated by the transmitted piece of ID information to enter the room 200 (step S4). The inside of the room 200 is captured by the monitoring cameras 11. Based on the videos captured by the monitoring cameras 11, the person detecting section 133 detects individual persons having entered the room 200.

On the other hand, when determining that the number of persons having been detected by the room occupant detecting section 132 at the time of ID authentication in step S1 has reached the predetermined maximum number of persons detectable by the person detecting section 133 (YES in step S3), the room entry and exit management section 131 accesses the personal data storage section 14 to acquire information on the post of the person indicated by the transmitted piece of ID information and information on the posts of all persons (information on posts contained in the pieces of ID information on the persons) present in the room 200 (step S5). Then, the room entry and exit management section 131 determines, based on the acquired information on posts, the respective degrees of priority for the persons so that, for example, the degrees of priority for the posts of the president, division chief, manager, and ordinary staff member are highest, high, middle, and low, respectively.

Then, the room entry and exit management section 131 compares the degree of priority for the current entry applicant indicated by the above piece of ID information with the degrees of priority for the persons present in the room 200 (step S6). When, as a result, determining that the degree of priority for the entry applicant is lower than the degrees of priority for all the persons present in the room 200 (YES in step S7), the room entry and exit management section 131 does not allow the entry applicant to enter the room 200 (step S8).

On the other hand, when determining that one or more persons present in the room 200 have lower degrees of priority than the current entry applicant (NO in step S7), the room entry and exit management section 131 identifies a person having the lowest degree of priority from among persons present in the room 200 and having lower degrees of priority than the current entry applicant (step S9) and performs room exit request processing for requesting the identified person to leave the room 200 (step S10).

As this room exit request processing, for example, the room entry and exit management section 131 performs a control for allowing a speaker 101 placed in the room 200 to sound a message requesting the identified person to leave the room 200 through the communication section 240. Alternatively, the room entry and exit management section 131 uses the e-mail sending function of the communication section 240 to perform a control for transmitting an e-mail containing a message requesting the identified person to leave the room 200 to a mobile terminal that the identified person carries. The personal data storage section 14 previously stores e-mail addresses on an ID-by-ID basis and the room entry and exit management section 131 accesses the personal data storage section 14, reads out an e-mail address stored in association with the ID of the identified person, and uses the e-mail address for the above e-mail sending processing.

In this manner, for example, in the case where the maximum number of persons detectable by the person detecting section 133 are already present in the room 200 and a higher-level staff member attempts to enter the room 200, the room entry and exit management section 131 can request a lower-level staff member in the room 200 to leave the room 200.

When, after step S8 or step S10, the ID card reader 12 reads out a piece of ID information from the IC chip of an ID card through its mechanism on the inside of the room 200, the piece of ID information is transmitted as information on an exit applicant from the ID card reader 12 to the server 13, and the room entry and exit management section 131 determines that the transmitted piece of ID information is a piece of ID information on a pre-approved person and allows the person to leave the room 200, that is, when a person leaves the room 200 (YES in step S11), the room entry and exit management section 131 uses the e-mail sending function of the communication section 240 to perform entry permission notification processing for sending an e-mail containing a message indicating that entry into the room 200 has become possible to a mobile terminal that the person being refused permission to enter the room 200 or the person being requested to leave the room 200 carries (step S12). Also in this case, the personal data storage section 14 previously stores e-mail addresses on an ID-by-ID basis and the room entry and exit management section 131 accesses the personal data storage section 14, reads out an e-mail address stored in association with the ID of the person being refused permission to enter the room 200 or the person being requested to leave the room 200, and uses the e-mail address for the above e-mail sending processing. In the case where the determination in step S11 is YES as just described, the number of persons being allowed to stay in the room 200 is smaller than the maximum number of persons detectable by the person detecting section 133.

A general room entry and exit management system can always accurately know the total number of persons present in a room entry and exit management area using information from videos captured by cameras. Therefore, if the maximum number of persons that can stay in the area is exceeded, the system forbids entry into the area. In doing so, in order to monitor the behaviors of the persons present in the room entry and exit management area, it is necessary to keep on taking the individual persons with cameras. However, if the number of persons in the room entry and exit management area is large relative to the number of cameras installed in the area, the cameras cannot keep on taking all the persons, which arises a problem of reduced accuracy of security.

Unlike the above, according to this embodiment, the number of persons that can stay in the room 200 can be kept equal to or below the maximum number of persons detectable by the monitoring cameras 11 and, therefore, the individual persons present in the room 200 can be accurately detected by video recording with the monitoring cameras 11.

Figure 4:
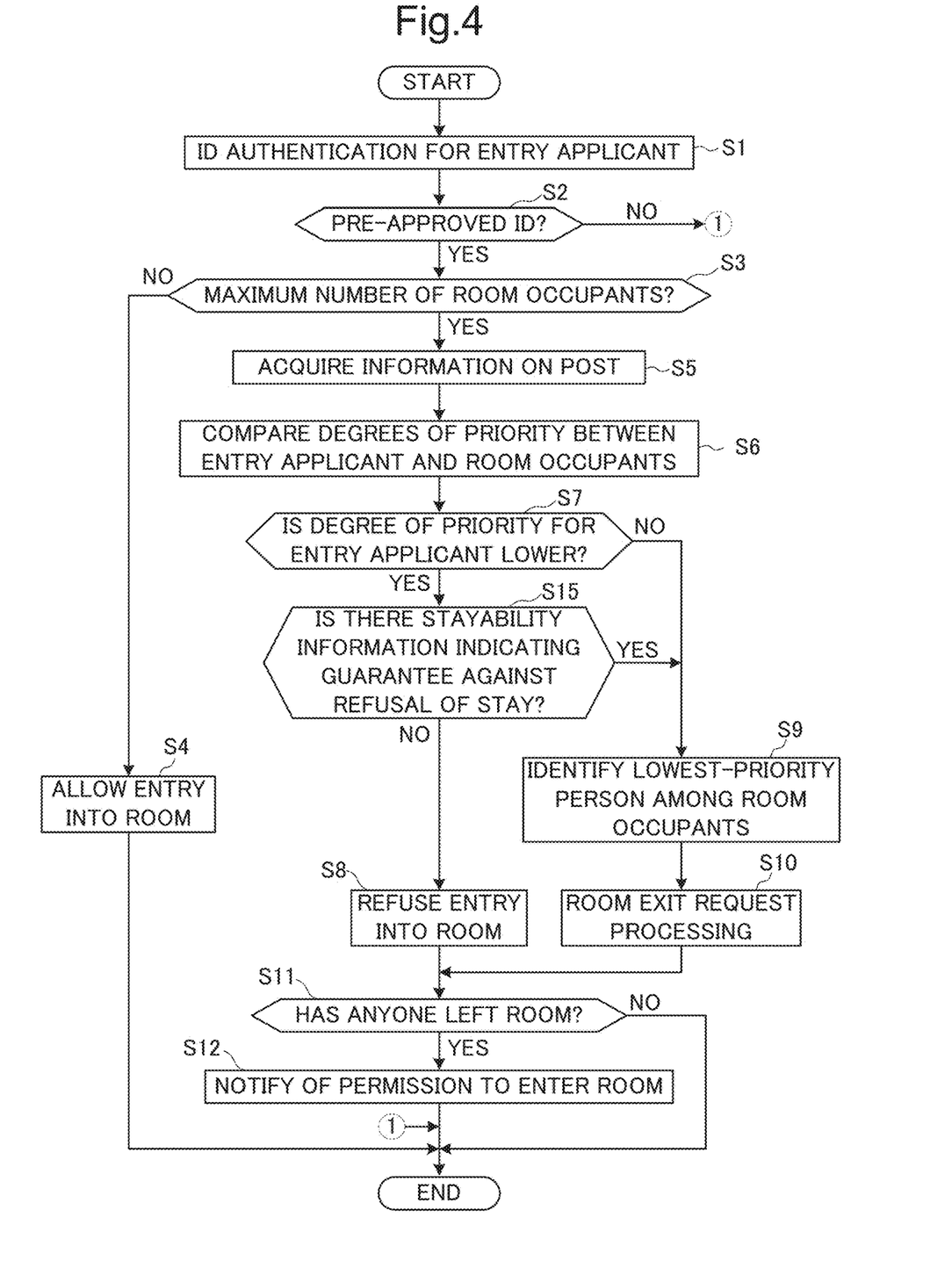
FIG. 4 is a flowchart showing a second embodiment of room occupant monitoring processing by the room occupant monitoring system according to the one embodiment of the present disclosure.

The present disclosure is not limited to the configurations and processing in the above embodiment and can be modified in various ways. FIG. 4 is a flowchart showing a second embodiment of room occupant monitoring processing by the room occupant monitoring system 10. Further explanation of the same steps of processing as those in the first embodiment will be omitted.

For example, although in the above embodiment the room entry and exit management section 131 performs processing for refusing permission to enter the room or the room exit request processing according to the post of each person, there may be cases where even an ordinary staff member or a low-level staff member should be allowed to enter the room 200 in priority to the other staff members, for example, for the purposes of dealing with urgencies. For such an occasion, the personal data storage section 14 previously stores, for each person (each ID), stayability information indicating whether or not the person is guaranteed against refusal of stay in the room 200. As shown in FIG. 4, even if the room entry and exit management section 131 has determined that the degree of priority for an entry applicant is lower than the degrees of priority for all the persons in the room 200 (YES in step S7), but if the personal data storage section 14 stores stayability information indicating that the entry applicant is guaranteed against refusal of stay in the room 200 (YES in step S15), the room entry and exit management section 131 may perform neither processing for refusing the entry applicant's request to enter the room 200 nor processing for requesting him/her to leave the room 200, identify a person having the lowest degree of priority from among the persons present in the room 200 (step S9), and perform the room exit request processing for requesting the identified person to leave the room 200 (step S10).

Thus, if the personal data storage section 14 previously stores stayability information on an ordinary staff member or a low-level staff member, indicating that he/she is guaranteed against refusal of stay in the room 200 and the staff member needs to enter the room 200 for the purpose of dealing with urgencies, he/she can be exempt from the processing for refusing permission for him/her to enter the room 200 and the room exit request processing even if the number of persons in the room 200 has reached the predetermined maximum number of persons detectable by the person detecting section 133 and all the persons in the room 200 have higher posts.

Figure 5:
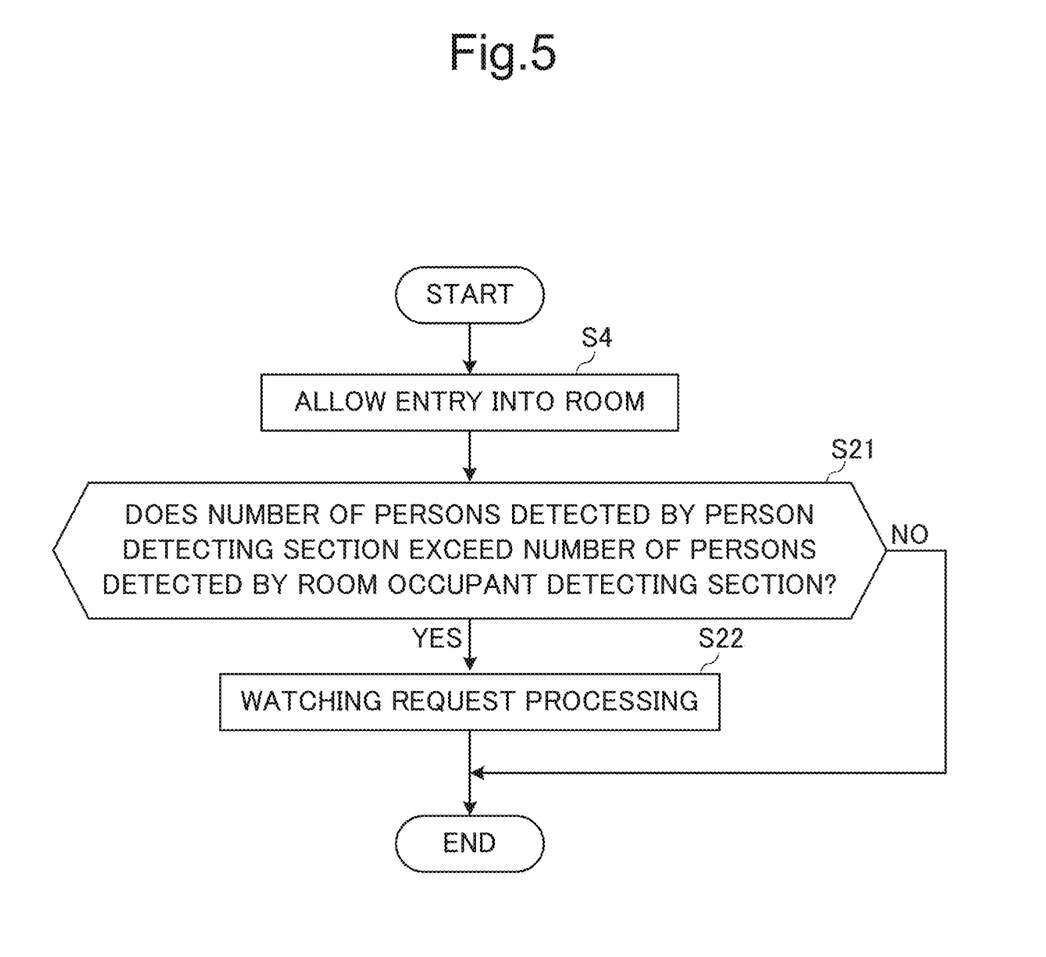
FIG. 5 is a flowchart showing a third embodiment of room occupant monitoring processing by the room occupant monitoring system according to the one embodiment of the present disclosure.

FIG. 5 is a flowchart showing a third embodiment of room occupant monitoring processing by the room occupant monitoring system 10. The processing in the third embodiment is performed after the processing for allowing entry into the room 200 (step S4) in the first and second embodiments.

For example, there may be a case where a person allowed to enter the room 200 in step S4 enters the room 200 along with a guest on whom no piece of ID information is stored in the personal data storage section 14 (and he/she enters the room 200 without ID authentication). As for such a guest lacking ID authentication, his/her behavior needs to be more carefully monitored. Therefore, if, after the permission for a person to enter the room 200 (step S4), the number of persons detected by the person detecting section 133 exceeds the number of persons detected by the room occupant detecting section 132 (YES in step S21), the room entry and exit management section 131 performs watching request processing for requesting the person allowed to enter the room 200 in step S21 to keep watch over the accompanying person (guest) having entered the room 200 at the same time (step S22). For example, the room entry and exit management section 131 uses the e-mail sending function of the communication section 240 to perform, as the watching request processing, processing for sending an e-mail containing a message requesting the person allowed to enter the room 200 in step S4 to keep watch over the accompanying person having entered the room 200 at the same time to a mobile terminal that the person allowed to enter the room 200 in step S4 carries.

In this case, it is necessary to keep careful watch over the behavior of the guest. Therefore, in detecting the number of persons present in the room 200, the room occupant detecting section 132 may count a single guest lacking a piece of ID information in the personal data storage section 14 as predetermined two or more persons. For example, suppose that four monitoring cameras 11 are in the room 200, each monitoring camera 11 can detect up to five persons, and a combination of all the monitoring cameras 11 can detect up to 20 persons in the room 200. In this case, for example, if only one guest is present in the room 200 and the room occupant detecting section 132 counts the one guest as two persons, the number of persons actually present in the room 200 is 19 even if the room occupant detecting section 132 detects that the number of persons present in the room 200 has reached the maximum number of persons, 20. Therefore, if any guest is present in the room 200, the number of persons actually present in the room 200 can be reduced. As a result, the persons in the room 200 can be detected with room for the ability of the plurality of monitoring cameras 11 and, therefore, the persons, including guests, in the room 200 can be more accurately detected to further improve the security level.

In still another embodiment, if the persons being allowed to stay in the room 200 include any person having a post exceeding a predetermined level, in detecting the number of persons present in the room 200, the room occupant detecting section 132 may not count any person having a post exceeding the predetermined level. The room occupant detecting section 132 accesses the personal data storage section 14 to acquire information on the posts of the persons being allowed to stay in the room 200. Regarding the number of persons present in the room 200, the room entry and exit management section 131 determines, based on the number of persons among which any person having a post exceeding the predetermined level is not counted, whether or not the maximum number of persons detectable by the person detecting section 133 is reached.

Although in the above embodiments a plurality of monitoring cameras 11 are installed in the room 200, a single monitoring camera 11 may be installed in the room 200.

The structures, configurations, and processing described in the above embodiments with reference to FIGS. 1 to 5 are merely illustrative of the present disclosure and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. A room occupant monitoring system comprising:
   a personal data storage section that stores respective pieces of ID information on persons;
   an information acquisition section that is provided at an entrance of a room and acquires, at time of entry and exit of a person into and from the room, a piece of ID information from an ID storage medium that the person carries;
   a monitoring camera that is installed in the room and captures a video of an inside of the room; and
   a server that comprises a control unit and a storage section, the control unit containing a processor and functioning as, upon execution of a control program by the processor,
   a room entry and exit management section that performs ID authentication by comparison of the pieces of ID information stored in the personal data storage section with the piece of ID information acquired from the ID storage medium of the person by the information acquisition section and determines, based on a result of the ID authentication, whether or not to allow the person to enter or leave the room,
   a room occupant detecting section that detects, based on results of permission for persons to enter and leave the room determined by the room entry and exit management section, persons present in the room at time of the ID authentication and a number of the persons in the room at time of the ID authentication, and
   a person detecting section that analyzes the video captured by the monitoring camera to detect an individual person in the video,
   wherein the room entry and exit management section allows the storage section to store respective predetermined degrees of priority for the persons to be allowed to stay in the room, and
   if, upon the ID authentication for an entry applicant newly wishing to enter the room, one of the pieces of ID information stored in the personal data storage section matches the piece of ID information on the entry applicant acquired from the ID storage medium by the information acquisition section and the number of persons detected by the room occupant detecting section has reached a maximum number of persons detectable by the person detecting section, the room entry and exit management section compares the degree of priority for the entry applicant with the degrees of priority for all persons under management of the room occupant detecting section and, (i) if the degree of priority for the entry applicant is lower than the degrees of priority for all the persons under the management, refuses permission for the entry applicant to enter the room or, (ii) if the degree of priority for any one of all the persons under the management is lower than the degree of priority for the entry applicant, performs room exit request processing for requesting the person having the lower degree of priority to leave the room.

2. The room occupant monitoring system according to claim 1, wherein
   the personal data storage section stores information on respective posts of the persons, and
   the room entry and exit management section determines the respective degrees of priority for the persons based on the information on the respective posts stored in the personal data storage section and allows the storage section to store the determined degrees of priority.

3. The room occupant monitoring system according to claim 1, wherein
   the personal data storage section stores, on each of the persons, stayability information indicating whether or not the person is guaranteed against refusal of stay in the room, and
   as for the person on whom the stayability information indicates that the person is guaranteed against refusal of stay in the room, regardless of the degree of priority, the room entry and exit management section allows the person to enter the room or avoids performing the room exit request processing.

4. The room occupant monitoring system according to claim 1, wherein when the number of persons being allowed to stay in the room becomes lower than the maximum number of persons detectable by the person detecting section, the room entry and exit management section performs notification processing for notifying the person being refused permission to enter the room or the person being subject to the room exit request processing of a message of permission to enter the room.

5. The room occupant monitoring system according to claim 1, wherein when, after permission for a person to enter the room, the number of persons detected by the person detecting section exceeds the number of persons detected by the room occupant detecting section, the room entry and exit management section performs watching request processing for requesting the person allowed to enter the room to keep watch over a person having entered the room along with the person allowed to enter the room.

6. The room occupant monitoring system according to claim 1, wherein if no piece of ID information on a person detected by the person detecting section is stored in the personal data storage section, the room entry and exit management section adds a predetermined number to the number of persons being allowed to stay in the room to obtain a number of persons in the room and then determines whether or not the number of persons in the room has reached the maximum number of persons detectable by the person detecting section.

7. The room occupant monitoring system according to claim 2, wherein if the persons being allowed to stay in the room include a person having a post exceeding a predetermined level, the room entry and exit management section excludes the person having a post exceeding the predetermined level from counting as a person being allowed to stay in the room and then determines whether or not the number of persons being allowed to stay in the room has reached the maximum number of persons detectable by the person detecting section.

8. The room occupant monitoring system according to claim 1, wherein if one of the pieces of ID information stored in the personal data storage section matches the piece of ID information on the entry applicant acquired from the ID storage medium by the information acquisition section and the number of persons detected by the room occupant detecting section is smaller than the maximum number of persons detectable by the person detecting section, the room entry and exit management section allows the entry applicant to enter the room.

9. The room occupant monitoring system according to claim 1, wherein if, upon the ID authentication for an exit applicant newly wishing to leave the room, one of the pieces of ID information stored in the personal data storage section matches the piece of ID information on the exit applicant acquired from the ID storage medium by the information acquisition section, the room entry and exit management section allows the exit applicant to leave the room and performs notification processing for notifying the entry applicant being refused permission to enter the room or the person being subject to the room exit request processing of a message of permission to enter the room.

10. The room occupant monitoring system according to claim 2, wherein
the personal data storage section stores, on each of the persons, stayability information indicating whether or not the person is guaranteed against refusal of stay in the room, and
if the personal data storage section stores the stayability information on the entry applicant indicating that the entry applicant is a person guaranteed against refusal of stay in the room, the room entry and exit management section performs the room exit request processing for the person having the lowest degree of priority among the persons in the room even if the degree of priority for the entry applicant is lower than the degrees of priority for all the persons in the room.

* * * * *